United States Patent [19]
Johnson

[11] 3,926,286
[45] Dec. 16, 1975

[54] SPRING GRIP CLUTCH
[75] Inventor: Lee W. Johnson, Lake Elmo, Minn.
[73] Assignee: Reell Precision Manufacturing Corporation, St. Paul, Minn.
[22] Filed: Sept. 23, 1974
[21] Appl. No.: 508,069

Related U.S. Application Data
[63] Continuation-in-part of Ser. No. 329,352, Feb. 5, 1973, abandoned.

[52] U.S. Cl................................ 192/41 S; 192/26
[51] Int. Cl.² ......................................... F16O 11/06
[58] Field of Search......... 192/26, 33 C, 41 S, 56 C, 192/107 M, 107 T, 110 S, 81 C, 12 BA

[56] References Cited
UNITED STATES PATENTS
3,618,721 11/1971 Hare .............................. 192/41 S X
3,726,372 4/1973 Baer et al. .............................. 192/26

Primary Examiner—Samuel Scott
Assistant Examiner—Frank H. McKenzie, Jr.

[57] ABSTRACT

A spring grip clutch comprising an expandable spring which grips adjacent peripheral surfaces of driving and driven hubs mounted in axial alignment on a tubular sleeve, wherein one of said hubs extends beyond the sleeve and attaches directly to a drive shaft or trunnion passing within the sleeve.

6 Claims, 4 Drawing Figures

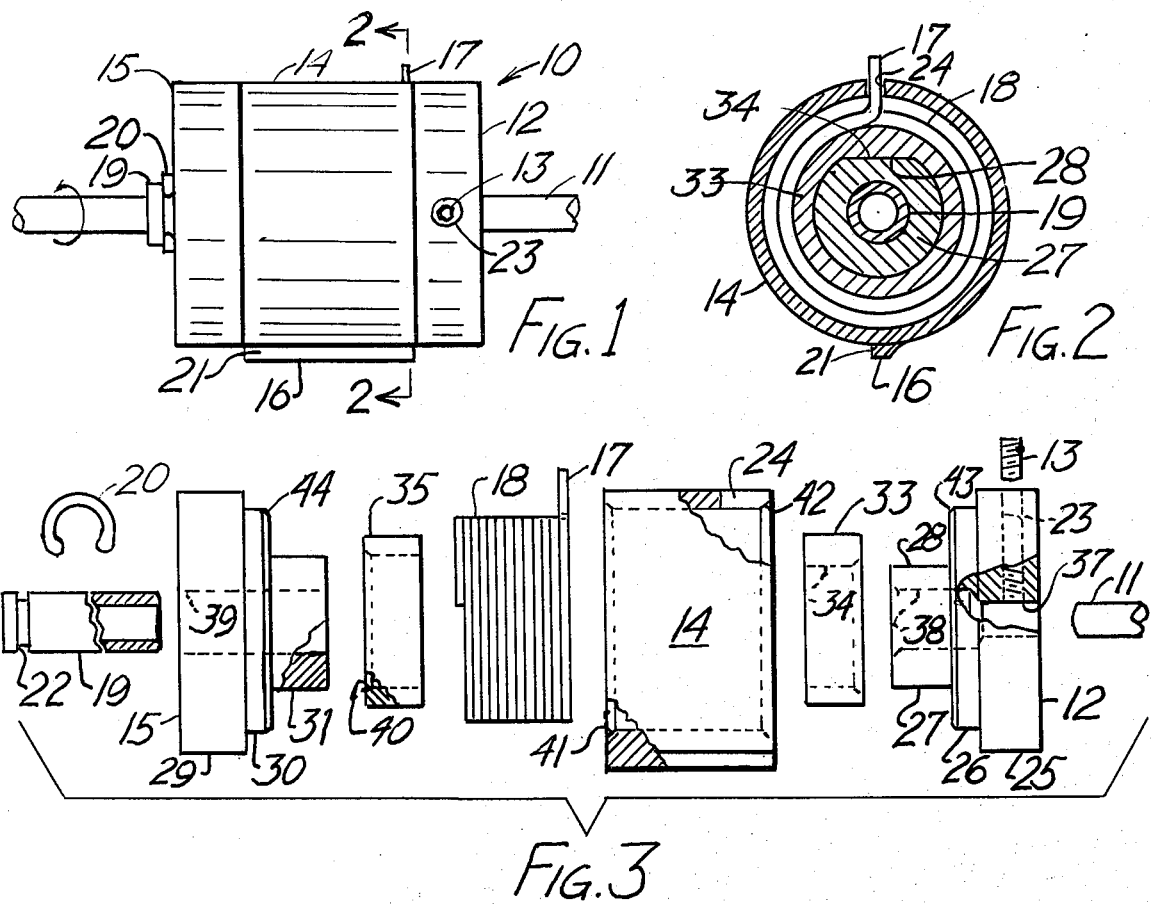
Fig.1
Fig.2
Fig.3
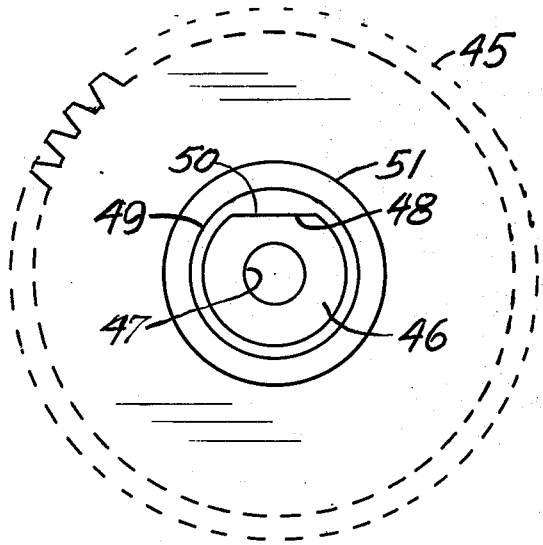
Fig.4

SPRING GRIP CLUTCH

This application is a continuation-in-part of my co-pending application Ser. No. 329,352 filed Feb. 5, 1973 now abandoned.

This invention relates to one-way drive mechanisms, and more particularly to improvements in one-way spring grip drive or clutch mechanisms and methods of making the same. Such mechanisms have utility in transmitting power at desired intervals from a continuously operating source, for example in periodically feeding sheets of paper from a stack of sheets into a printing press.

The mechanism consists generally of a tubular shaft or sleeve carrying first and second hub members in axial alignment. One of said hub members, here identified as the drive hub, is fixed to said shaft; the other, here the driven hub, is freely rotatable about the shaft. The two hub members have adjoining hard wear-resistant peripheral surfaces, and an expandable spring member grippingly encircles said surfaces. Radial expansion of the spring, by application of torque against the leading end, permits slippage between spring and hub and effects disengagement of the clutch.

In mounting the drive hub on the tubular shaft it has previously been the practice to pass the shaft through the hub and then to drill and tap both hub and shaft to receive a set-screw. The practice is illustrated in U.S. Pat. No. 3,726,372, showing a hub 24 affixed to a sleeve 25 by a screw 27 which additionally anchors both hub and shaft to a drive trunnion 26. The use of a previously hardened shaft is precluded. The alternative procedure, of first drilling and then hardening the shaft before inserting it in the hub, requires additional operations and is uneconomical.

The present invention permits anchoring of the hub to the drive shaft by means of a set-screw while at the same time permitting use of a pre-hardened tubular shaft or sleeve and avoiding any problems of accurate alignment between shaft and hub. The invention also makes possible improved accuracy and efficiency in the assembly of the clutch mechanism.

The invention will now be more fully described in connection with the accompanying drawing, wherein:

FIG. 1 is a side elevation of one form of clutch,

FIG. 2 is a cross-sectional elevation taken approximately at line 2—2 of FIG. 1, FIG. 3 is an exploded view showing the several components of the device of FIGS. 1 and 2 mainly in side elevation and in partial section, and FIG. 4 is a partial end elevation of an alternative form of driven hub assembly.

FIGS. 1 – 3 illustrate a spring grip clutch device 10 supported on a shaft 11 which is indicated in FIG. 1 as being subject to continuous rotation. A drive hub 12 is fastened to the shaft 11 by means of a setscrew 13 within a tapped bore 23 in the outer portion of the hub and rotates with the shaft. A tubular sleeve or cover 14 lies between the drive hub and a driven hub 15, and is provided with a longitudinal ridge 16 and at one end with a narrow longitudinal slot 24 through which passes a radially extending end 17 of a coil spring 18. The entire assembly is mounted on a tubular shaft or sleeve 19 and held together with a spring clip 20.

As the shaft 11 and attached drive hub 12 rotate, a stop, not shown, contacts the radially extending front face 21 of the ridge 16 and prevents rotation of the cover 14, thereby maintaining the spring 18 in expanded condition and permitting slippage between it and the smooth peripheral drive face of the hub 12. Under these conditions the cover 14, hub 15, and spring 18 remain stationary while the drive hub 12 and shaft 19 continue to rotate with the shaft 11. Retraction of the stop, permitting free rotation of the cover, allows the spring 18 to contract, in which condition it tightly grips both hubs, resulting in rotation of the entire assembly.

Drive hub 12 has an outer disc portion 25 of relatively large diameter, a narrow intermediate portion 26 of somewhat smaller diameter, and a wider inner portion 27 of considerably smaller diameter and having a flat 28 on its periphery. Similarly, driven hub 15 has an outer portion 29, intermediate portion 30, inner portion 31, and flat 32 (not shown).

Ring 33, having an inner flat 34, fits around the inner portion of hub 12, and ring 35 (with flat 36, not shown) similarly fits around inner portion 31 of hub 15, the smooth outer peripheries of the rings serving as driving and driven surfaces respectively.

The axial bore 37 within the outer portion 25 of drive hub 12 approximates the diameter of the bore of the tubular shaft 19, providing a close fit for the shaft 11 on which the device is to be mounted. It is enlarged, as inner bore 38 through portions 26 and 27 of the hub, to a diameter sufficient to receive the end portion of the tubular shaft 19 in a tight press fit. The axial bore 39 of hub 15 is slightly larger, permitting free rotation of the hub about the shaft 19.

The assembly is held together and with the inner end faces of the two hub members closely adjacent each other by a spring clip 20 fitting into a circumferential groove 22 located near the exposed end of the tubular shaft 19.

The spring 18 is close-wound and to an internal diameter in the relaxed state which is sufficiently smaller than the diameter of the drive faces to provide the desired degree of drive torque. The inner surface of the strip of which the spring is wound is preferably flat to give maximum contact with the drive faces. The spring fits well within the inner diameter of the cover 14, the latter element in turn being rotatably positioned over the intermediate hub portions 26, 30. The shaft 19 is rigidly held in the bore 38 of the hub 12 and rotates with the hub and the shaft 11.

To assist in assembly, meeting edges may be beveled if desired, for example as indicated for ring 35 at bevel 40, for cover 14 at bevels 41, 42 and for the intermediate hub portions 26, 30 at bevels 43, 44 respectively. Assembly is accomplished by simply placing the components together in alignment and forcing them together in a suitable press.

The hub members 12, 15 are desirably formed from powdered metal, by pressing in appropriate molds followed by sintering. The procedure makes for economy in manufacture, permits attainment of any desired degree of hardness or machinability, and in particular permits impregnation with oil to provide a self-lubricating capability. The rings 34, 35 are likewise press formed from powdered metal and are sintered. Typically, the hubs are made of iron-copper alloy identified as FC-1000-N giving in the sintered product a Rockwell F hardness of 70, while the rings are of nickel steel (FN-0208-R) and have a hardness of 62 on the Rockwell B scale. The tubular steel shaft 19 is also hardened to provide both inner and outer hard wear-resistant surfaces.

An important feature of the structure is that the hub 12 may be drilled and tapped to provide the bore 13 at any time either before or after assembly, without encountering any difficulties either in drilling or in assembling. The hub 15 may likewise be machined as required, for example by drilling and tapping to permit attachment of a spur gear by means of machine screws.

For making driving contact with external mechanism, a gear 45 as illustrated in FIG. 4 may replace the hub 15 if desired. The gear 45 consists of a spur gear or toothed disc of nylon or other analogous hard tough plastic material having a central hub 46 with an axial bore 47 and a flat 48. It is fitted with a hardened metal ring 49 having a matching flat 50. An intermediate portion 51 extends outwardly from the flat inner face of the gear and serves as a support for the cover member in the same manner as does portion 30 of hub 15. The structure results in reduced operational noise yet the wear resistance at the drive face is fully as great as with the all-metal construction.

FIGS. 1 – 3 illustrate but a single external ridge 16, and for a single catch member such a structure will obviously permit one full revolution of the hub 15 before the clutch will again be disengaged. Additional revolutions may be permitted by simply holding the catch in the inactive position. Fractional revolutions may alternatively be achieved, for example by placing additional catch members at desired points around the periphery, or by providing additional ridges at desired locations around the cover.

In the foregoing description the clutch has been described as driven from a shaft and in turn driving a gear. By merely removing the clip 20 and hub 15, turning the spring and cover end for end, and replacing the hub and clip, the opposite drive sequence is easily set up, with the gear 45 or the appropriately fitted hub 15 becoming the drive element and the hub 12 attached to the shaft 11 becoming the driven element.

What is claimed is as follows:

1. A one-way helical spring clutch comprising a tubular shaft or sleeve having an outside and an inside diameter, first and second hub members, each having an axial bore, supported on said shaft in axial alignment and having adjoining peripheral surfaces, and an expandable spring member grippingly encircling said surfaces, one of said hub members being rigidly attached to, and extending axially beyond, said shaft, the axial bore in the extended portion being of approximately the same diameter as the inside diameter of said shaft.

2. Clutch of claim 1 wherein said one hub member includes fastening means within said extended portion for fastening said clutch to a drive shaft or trunnion fitting within said tubular shaft, and wherein said peripheral surfaces of said hubs are of greater hardness and wear-resistance than said extended portion.

3. Clutch of claim 2 wherein said hard wear-resistant peripheral surfaces are provided by replaceable rings of sintered powdered metal alloy.

4. Clutch of claim 1 including a terminally slotted sleeve loosely surrounding said spring member and wherein said spring member includes a radially extending terminal fitting within the terminal slot in said sleeve.

5. Clutch of claim 4 wherein each of said hub members is provided with a narrow flange intermediate the ends and said sleeve is rotatably supported on said flanges.

6. Clutch of claim 5 wherein said sleeve is provided with at least one external longitudinal ridge.

* * * * *